United States Patent

[11] 3,570,629

| [72] | Inventors | Wolfram Dahm<br>Raidwangen Kreis Nurtingen;<br>Erhard Melcher, Grobaspach<br>Wurttemberg; Klaus Nied, Schmiden<br>Wurttemberg; Alfons Hackenberg, Ruit,<br>Filder; Ladislaus Weber, Schorndorf,<br>Germany |
|---|---|---|
| [21] | Appl. No. | 766,746 |
| [22] | Filed | Oct. 11, 1968 |
| [45] | Patented | Mar. 16, 1971 |
| [73] | Assignee | Daimler-Benz Aktiengesellschaft<br>Stuttgart-Unterturkheim, Germany |
| [32] | Priority | Oct. 12, 1967 |
| [33] | | Germany |
| [31] | | P 15 76 367.4 |

[54] INSTALLATION FOR THE AUTOMATIC REFILLING OF LUBRICATING OIL
17 Claims, 7 Drawing Figs.

| [52] | U.S. Cl. | 184/103, 137/44 |
|---|---|---|
| [51] | Int. Cl. | F01m 11/12 |
| [50] | Field of Search | 184/103, 103 (A); 137/38, 44, 45, 46; 123/198, 139.16 |

[56] References Cited
UNITED STATES PATENTS

| 1,485,729 | 3/1924 | Sommerfeldt | 184/103 |
| 2,208,912 | 7/1940 | Simpson | 184/103 |
| 2,792,912 | 5/1957 | Kangas | 184/103 |

*Primary Examiner*—Manuel A. Antonakas
*Attorney*—Craig, Antonelli, Stewart & Hill

ABSTRACT: An installation for the automatic refilling of lubricating oil from a supply vessel into the oil pan of internal combustion engines in which two floats are secured at a pivotal lever linkage which actuates a needle valve controlling the supply of the oil from the vessel into the pan.

PATENTED MAR 16 1971 3,570,629

INVENTORS
WOLFRAM DAHM
ERHARD MELCHER
KLAUS NIED
ALFONS HACKENBERG
LADISLAUS WEBER

BY Craig & Antonelli

ATTORNEYS

INSTALLATION FOR THE AUTOMATIC REFILLING OF LUBRICATING OIL

The present invention relates to an installation for the automatic refilling of lubricating oil from a supply tank or vessel into the oil pan of internal combustion engines, especially of internal combustion engines built into road vehicles. The oil supply to the pan is regulated according to the present invention by means of floats secured at a pivotal lever linkage, which open up or close the oil supply from the supply container by way of a needle valve connected with the lever linkage in dependence on the liquid level. Two mutually diagonally oppositely disposed floats are provided whose distances from the two major axes of the oil pan are equal or nearly equal. This entails the advantage that the refilling installation remains effective independently of the inclinations of the vehicle during up or downhill drives as well as during curve drives.

With internal combustion engines installed into motor vehicles, the pan connected with the engine block is frequently selected so large that it is able to accommodate the entire requisite oil supply. However, in other cases, the oil pan by reason of the required bottom clearance or by reason of the front or rear axle being located within this area cannot be selected so large that the entire oil supply is accommodated therein. The lubricating oil in that case has to flow from a higher supply tank or container into the relatively small oil pan when the oil level has dropped below a predetermined level. The resupply of the oil from the supply tank can be thereby regulated or controlled by way of electric or pneumatic installations. In the former case, a valve arranged at the supply tank or vessel is selectively opened or closed by means of a transmitter. Since the control valve is disposed in that case outside of the engine block and since the oil temperatures in the oil pan and in the supply tank are different, the quantity resupplied from the tank is not always sufficient for the actual need. With pneumatically operating installations, a pipe riser is extended from the oil pan to the supply tank which, with a predetermined oil level, closes off the air supply in the supply tank and therewith interrupts a flow of the oil into the sump or pan. It can thereby happen during inclinations of the vehicle, when driving up or downhill during curve drives, that during tilting of the oil level, air enters into the pipe riser and, as a result thereof, oil flows unintentionally into the pan.

With the installation according to the present invention for the automatic refilling of lubricating oil from a supply tank into the oil pan, two floats secured at a pivotal lever linkage take care for the correct adjustment of the oil level in the oil pan connected to the engine housing. The floats are arranged mutually diagonally opposite and their distances from the two major axes of the oil pan are equal or nearly equal. The linkage lever connected with one float is extended in one piece up to a pivot axis formed by a pivot pin secured at the oil pan whereas the other float is secured at an angularly bent lever starting from the linkage lever. A needle valve which either closes or opens the oil supply from the supply tank is secured, for example, on a plate connected with the lever linkage and acts on a valve seat disposed above the same which is built into an inlet member that is in communication by way of a line with the supply tank.

A further line leads from the oil pan to the bearing and load places utilizing the lubricating oil by the insertion of a strainer and of an oil pump. The arrangement of two mutually diagonally opposite floats in the oil pan entails the advantage that the automatically controlled oil supply from the supply tank operates independently of the inclination of the motor vehicle when driving up or downhill or while driving through curves. Also with an inclined oil pan in the one or the other direction, one of the two floats remains within the oil sump of the pan and thus prevents an undesired flow or resupply of oil from the supply tank into the pan.

Accordingly, it is an object of the present invention to provide an installation for the automatic refilling of lubricating oil, especially for internal combustion engines of motor vehicles, which avoids by simple means the aforementioned shortcomings and drawbacks encountered in the prior art.

Another object of the present invention resides in an installation for the automatic refilling of lubricating oil from a supply tank to the oil sump of an internal combustion engine which is simple in construction and remains operable independently of the inclinations of the vehicle when driving over mountainous roads or through curves.

A further object of the present invention resides in an installation for the automatic refilling of lubricating oil which is reliable in operation regardless of temperature changes of the engine or of the oil tank.

Still another object of the present invention resides in an installation of the type described above which assures a sufficient amount of refill of oil without the danger of an excessive flow of oil from the supply tank to the sump of the internal combustion engine.

These and further objects, features, and advantages of the present invention will become more obvious from the following description when taken in connection with the accompanying drawing which shows, for purposes of illustration only, one embodiment in accordance with the present invention, and wherein.

Figure 1:
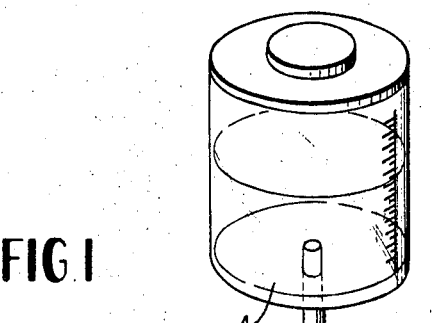
FIG. 1 is a perspective view of an installation having an oil pan and supply tank in accordance with the present invention.

Referring now to the drawing wherein like reference numerals are used throughout the various views to designate like parts, reference numeral 1 designates the oil pan connected with the engine block (not shown), within which is arranged a lever linkage 11, 12; mutually diagonally opposite floats 9 and 10 are secured at the lever linkage 11, 12. The uninterrupted and rectilinearly extending lever linkage 11 is pivotally supported on a fixed pivot shaft 15 held in plates 14 of the pan 1. The lever linkage 12 connected with the float 10 starts as angularly bent linkage from the lever 11. A needle valve 7 is secured on a plate 13 connected with the lever linkage 11, 12. An inlet member 6 provided with a valve seat is disposed above the needle valve 7 and is rigidly secured at the pan 1 by way of a mount or bracket 8. The inlet member 6 is operatively connected by way of a line 5 with a higher, transparent supply tank or container 4. A convention strainer 2 together with an oil pump is arranged in the bottom of the oil pan 1 whereby the lubricating places of the internal combustion engine are supplied with oil by way of the line 3 extending outwardly from the strainer 2. The arrow x indicates the driving direction.

Figure 2:
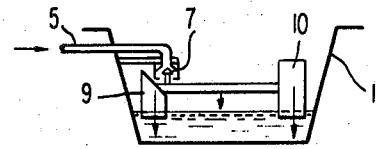
FIG. 2 is a somewhat schematic elevational view illustrating the opening of the oil supply in dependence on the oil level.
Figures 3, 7:
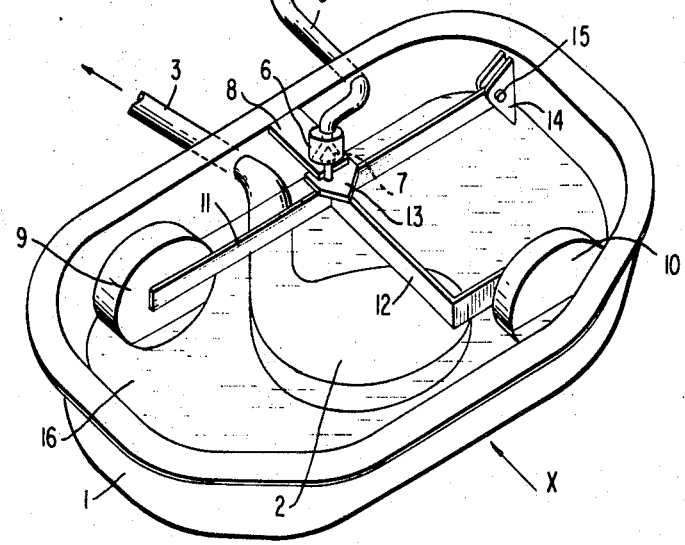
FIG. 3 is a somewhat schematic view indicating the closing of the oil supply in dependence on the oil level.
FIGS. 6 and 7 are somewhat schematic elevational views illustrating the oil pan and floats when driving through left-handed and right-handed curves.
Figure 4:
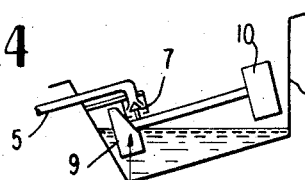
FIGS. 4 and 5 are somewhat schematic views of the oil pan and floats when driving downhill and uphill, respectively.
Figure 5:
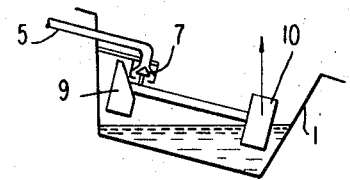
Figure 6:
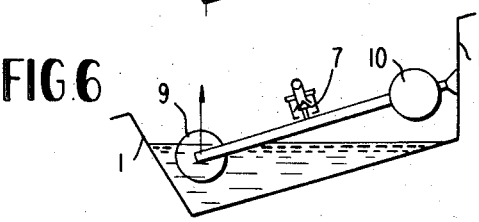

The operation of the installation according to the present invention is as follows:

If the oil level 16 in the pan 1 drops below a predetermined amount, then the lever linkage 11, 12 connected with the floats 9 and 10 pivots downwardly and the needle valve 7 opens up the oil supply from the supply tank 4 until the oil level in the pan 1 has risen to such an extent that by means of the floats 9 and 10 the needle valve 7 closes the supply aperture by way of the lever linkage 11, 12 (FIGS. 2 and 3). When driving downhill, the oil pan 1 assumes an inclined position as shown in FIG. 4 so that only the float 9 is immersed in the oil sump 16 and thereby keeps the needle valve 7 closed. The position of the oil pan 1 during uphill drives is illustrated in FIG. 5 whereby in that case the float 10 immerses into the oil sump 16 and keeps the needle valve 7 closed. Similar conditions may occur during curve drives whereby the oil pan 1 is inclined toward one or the other side when driving through left-hand or right-hand curves (FIGS. 6 or 7) and either the float 9 or the float 10 keeps the needle valve 7 closed as a result of its immersion into the oil sump 16.

The arrangement of the needle valve 7 effecting the oil supply from the tank 4 to the oil pan 1 directly in the oil pan 1 entails additionally the advantage that the operating temperature of the engine directly influences the temperature of the inflowing oil.

While we have shown and described only one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are within the scope of those skilled in the art.

We claim:

1. An installation for the automatic refilling of lubricating oil from a supply tank into the oil pan of internal combustion engines, especially of internal combustion engines built into road vehicles, comprising two floats provided in the oil pan and secured to a common lever at spaced points thereon, said common lever being pivotally attached to said oil pan, and a needle valve connected to said lever for controlling the oil supply from the tank in dependence on the liquid level in the oil pan, whereby, in response to a displacement of said oil in said oil pan, causing a change in the position of one of said floats, said common lever will impart a corresponding change in the position of the other of said floats secured thereto, so as to maintain the position of said floats in said pan constantly fixed with respect to each other.

2. An installation according to claim 1, further comprising means pivotally securing said lever to said pan.

3. An installation according to claim 2, wherein the floats are arranged mutually and diagonally spaced with respect to one another and wherein the distances thereof from the two major axes of the oil pan are at least nearly equal.

4. An installation according to claim 3, wherein said distances are equal.

5. An installation according to claim 3, wherein said lever has a first portion thereof connected with one of the floats and is constructed as a rectilinearly and continuously extending arm extending up to the pivot axis fixed at the oil pan, and wherein the other float is secured to an additional portion of said lever which is angularly bent with respect to said first portion.

6. An installation according to claim 5, wherein said needle valve means is secured on a plate fastened to the lever.

7. An installation according to claim 6, wherein a line from the supply tank to the oil pan includes an inlet provided with a valve seat which is arranged above the needle valve and is secured at the oil pan by way of a mount.

8. An installation according to claim 1, wherein the floats are arranged mutually diagonally with respect to one another and wherein the distances thereof from the two major axes of the oil pan are at least nearly equal.

9. An installation according to claim 8, wherein said distances are equal.

10. An installation according to claim 2, wherein said lever has a first portion thereof connected with one of the floats and is connected as a rectilinearly and continuously extending arm extending up to the pivot axis fixed at the oil pan, and wherein the other float is secured to an additional portion of said lever which is angularly bent with respect to said first portion.

11. An installation according to claim 1, wherein said needle valve is secured on a plate fastened to the lever.

12. An installation according to claim 1, wherein a line from the supply tank to the oil pan includes an inlet provided with a valve seat which is arranged above the needle valve and is secured at the oil pan b—y way of a mount.

13. An installation according to claim 12, wherein said needle valve is secured on a plate fastened to the lever.

14. An installation according to claim 13, wherein the floats are arranged mutually diagonally with respect to one another and wherein the distances thereof from the two major axes of the oil pan are at least nearly equal.

15. An installation for the automatic refilling of lubricating oil from a supply tank into the oil pan of internal combustion engines, especially of internal combustion engines built into road vehicles, comprising two floats provided in the oil pan and secured to a lever means at spaced points thereon, said lever means being pivotally attached to said oil pan at a single pivot point, and a needle valve connected to said lever means for controlling the oil supply in dependence on the liquid level in the oil pan, whereby, in response to a displacement of said oil in said oil pan, causing a change in the position of one of said floats, said lever means will impart a corresponding change in the position of the other of said floats secured thereto, so as to maintain the position of said floats in said oil pan, constantly fixed with respect to each other.

16. An installation according to claim 15, wherein the floats are arranged mutually and diagonally spaced with respect to one another and wherein the distance thereof from the two major axes of the oil pan are at least nearly equal.

17. An installation according to claim 16, wherein said lever means has a first portion connected with one of the floats and is constructed as a rectilinearly and continuously extending arm extending up to the pivot axis fixed at the oil pan, and where in the other floats is secured to an additional portion of said lever means which is angularly bent with respect to said first portion.